June 23, 1959   R. J. TURNER ET AL   2,891,961
PROCESS FOR PREPARING 2-AMINO-5-MERCAPTO-1,3,4-THIADIAZOLE
Filed Dec. 16, 1957
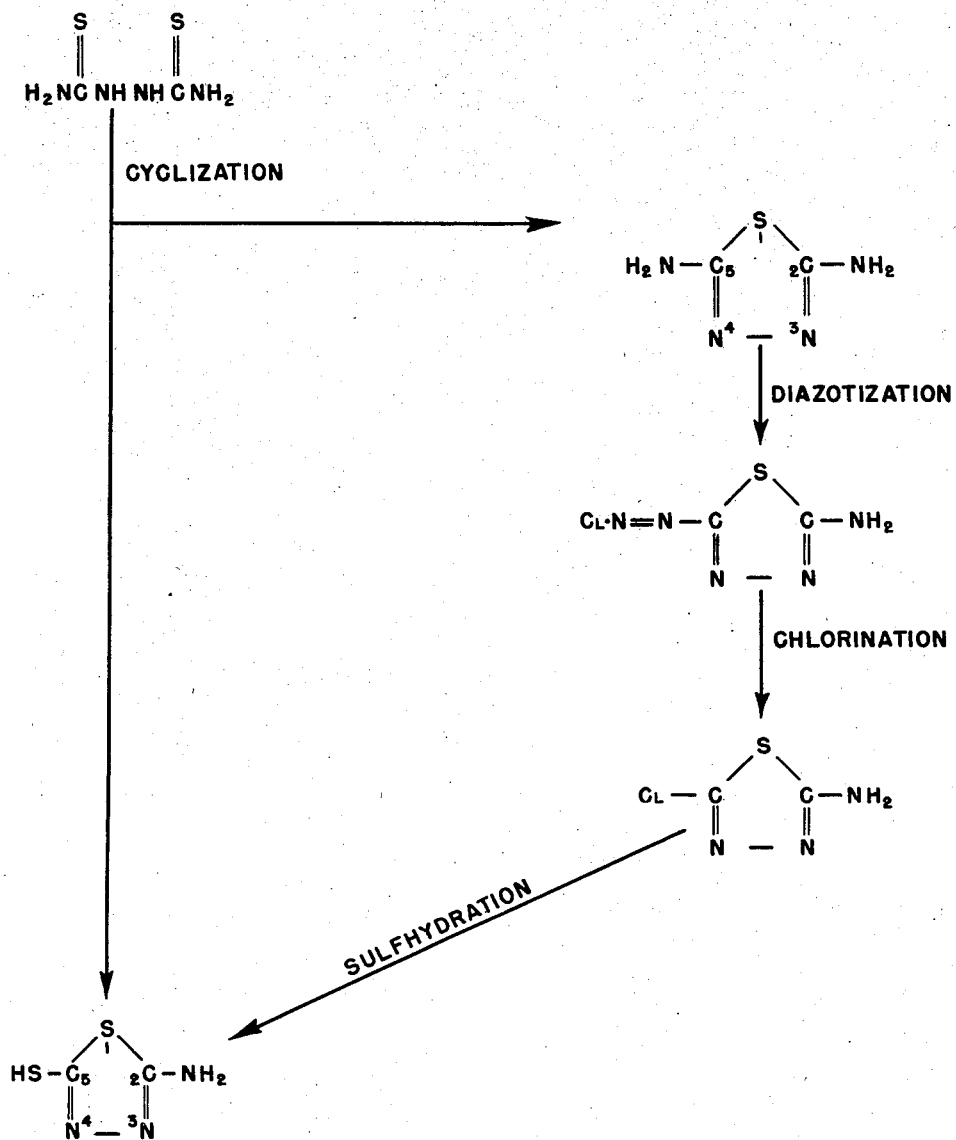
INVENTOR.
RICHARD J. TURNER
JOHN SONG
BY
*Samuel Branch Walker*
ATTORNEY

United States Patent Office 2,891,961
Patented June 23, 1959

2,891,961

PROCESS FOR PREPARING 2-AMINO-5-MERCAPTO-1,3,4-THIADIAZOLE

Richard J. Turner, New Orleans, La., and John Song, Bridgewater Township, Somerset County, N.J., assignors to American Cyanamid Company, New York, N.Y., a corporation of Maine Application December 16, 1957, Serial No. 702,934

3 Claims. (Cl. 260—306.8)

This invention relates to a process for preparing 2-amino-5-mercapto-1,3,4-thiadiazole from N,N'-bis(thiocarbamyl)hydrazine by direct cyclization and concomitant diazotization, chlorination and sulfhydration of by-product 2,5-diamino-1,3,4-thiadiazole to yield additional 2-amino-5-mercapto-1,3,4-thiadiazole.

This application is a continuation-in-part of our co-pending application Serial No. 543,280, filed October 27, 1955, Process for Preparing 2-Amino-5-Mercapto-1,3,4-Thiadiazole, which application is being abandoned in favor of the instant application.

2-amino-5-mercapto-1,3,4-thiadiazole is an intermediate useful in the preparation of 2-acetylamino-1,3,4-thiadiazole-5-sulfonamide and other related compounds, certain of which are described in United States Patent 2,554,816 to Clapp and Roblin, "Heterocyclic Sulfonamides and Methods of Preparation Thereof." 2-acetylamino-1,3,4-thiadiazole-5-sulfonamide has been produced by the treatment of hydrazine with a thiocyanate to form N,N'-bis(thiocarbamyl)hydrazine; which has been cyclized to 2-amino-5-mercapto-1,3,4-thiadiazole; which is acetylated to 2-acetylamino-5-mercapto-1,3,4-thiadiazole; which is oxidized and chlorinated to 2-acetylamino-1,3,4-thiadiazole sulfonyl chloride; which on treatment with ammonia 2-acetyl-amino-1,3,4-thiadiazole 5-sulfonamide.

This is a comparatively complex series of reactions and to reduce the price of pharmaceutical products, it is necessary that the efficiency be raised to as high a level as possible. In the cyclization of N,N'-bis(thiocarbamyl)hydrazine to give 2-amino-5-mercapto-1,3,4-thiadiazole at least some 2,5-diamino-1,3,4-thiadiazole is produced. Under certain reaction conditions 2,5-diamino-1,3,4-thiadiazole is the predominant or almost exclusive product.

We have found that additional 2-amino-5-mercapto-1,3,4-thiadiazole may be produced by diazotization, chlorination, and sulfhydration of the by-product 2,5-diamino-1,3,4-thiadiazole, which may be either mixed with the first crop of 2-amino-5-mercapto-1,3,4-thiadiazole, or used in separate batches for further chemical processing.

The reactions involved are shown diagrammatically in the figure.

It is unusual to be able to separate a by-product from a reaction and then treat that by-product so that it may rejoin the main stream in a chemical synthesis. It is much more common to recover unchanged starting material which may be recycled or by-products which may be separately utilized.

The ring closure of N,N'-bis(thiocarbamyl)hydrazine occurs in the presence of hydrochloric or hydrobromic acid; from about 1 to 12 normal acid may be used but from 2 to 4 normal is a preferred operating range. High temperatures favor the reaction so that temperatures of from about 90° C. to reflux are conveniently commercially used. Certain aspects of this conversion are described and claimed in Patent 2,759,947, J. Song and G. T. Fitchett, "Preparation of Amino-Mercapto-1,3,4-Thiadiazoles," August 21, 1956. The 2-amino-5-mercapto-1,3,4-thiadiazole may be separated from the solution by cooling to about room temperature and separating as a first crop. On further chilling to around 0° to 5° C. 2,5-diamino-1,3,4-thiadiazole separates as the hydrochloride hydrate.

The 2,5-diamino-1,3,4-thiadiazole as the hydrochloride hydrate is diazotized. It is neither necessary to separate the free 2,5-diamino-1,3,4-thiadiazole nor to dry it. Diazotization is readily accomplished in cold concentrated hydrochloric acid by adding sodium nitrite. The sodium nitrite is conveniently added as a concentrated aqueous solution although other diazotization procedures may be used. Without separating out the product which is probably 5-amino-2-(1,3,4-thiadiazolyl)diazonium chloride, the reaction mixture is heated which causes the elimination of nitrogen and conversion to 2-amino-5-chloro-1,3,4-thiadiazole. The chlorination step may be aided by the presence of metallic copper or cuprous or cupric ions conveniently added as the chloride. The use of copper powder is a form of the Gattermann synthesis; and the cuprous chloride is the Sandmeyer reaction. These reactions and conditions for them are well known to organic chemists. Certain phases of the reactions are described in the book "The Chemistry of Heterocyclic Compounds," L. L. Bambas, Interscience Publishers, Inc., New York, 1952, at pages 130 and 136.

The 2-amino-5-chloro-1,3,4-thiadiazole can, surprisingly, be easily and conveniently converted to 2-amino-5-mercapto-1,3,4-thiadiazole by treatment with a metallic sulfhydrate. This is most surprising since a chlorine attached to a thiadiazole ring would be expected to be unreactive. However, as unexpected as it may be, it is found that this process gives high yields of a pure product.

In commercial practice, the metallic sulfhydrate is conveniently an alkali metal sulfhydrate such as sodium or potassium, or an alkaline earth metal sulfhydrate such as calcium. Other metallic sulfhydrates may be used but the sodium, potassium and calcium sulfhydrates are particularly economical and convenient. The sulfhydrate may be added as such or it may be prepared in the reaction mixture from the corresponding metal hydroxide and hydrogen sulfide gas.

2-amino-5-chloro-1,3,4-thiadiazole may conveniently be used in the free form or in the form of an acid salt such as the hydrochloride which may be converted to the free form by treatment with an alkali.

At least about a stoichiometric quantity of the sulfhydrate is preferred but more is conveniently used as it is the cheapest reactant and drives the conversion to completion. Up to 2 mols of the sulfhydrate is normally economical and preferred. The reaction proceeds more rapidly at elevated temperatures, and accordingly, reflux conditions in an aqueous medium are preferred but other solvents are satisfactory. The use of an autoclave is unnecessary but is not precluded.

The 2-amino-5-mercapto-1,3,4-thiadiazole resulting may be added to the first crop produced by the cyclization of the N,N'-bis(thiocarbamyl)hydrazine or it may be used in separate batches for the same or different reactions.

In the present invention the various materials particularly 2,5-diamino-1,3,4-thiadiazole and 2-amino-5-chloro-1,3,4-thiadiazole may be separately separated and purified as by recrystallization but conveniently are reacted in situ without separation which simplifies the process.

By way of illustration but not limitation are given the following examples; the parts are by weight unless otherwise specified.

*Example 1*

One thousand grams of N,N'-bis(thiocarbamyl)hydrazine is slowly added to 8 liters of 4 normal hydrochloric acid, the mixture refluxed for 4 hours and permitted to cool overnight to room temperature. The first crop of 2-amino-5-mercapto-1,3,4-thiadiazole thus produced is filtered out and washed with cold water.

The residual mother liquor is chilled to about 5° C. and a crop of 2,5-diamino-1,3,4-thiadiazole crystallizes out. The slurry is filtered and the 2,5-diamino-1,3,4-thiadiazole is washed with ice water. The thus formed 2,5-diamino-1,3,4-thiadiazole is added to 2000 milliliters of concentrated hydrochloric acid and an excess of sodium nitrite as a 40% solution in water is added. The mixture is maintained at between a −5° and −15° C. temperature in an acetone carbon dioxide snow bath. After stirring at this temperature for 2 hours, the thus produced diazotized compound, presumably 5-amino-2-(1,3,4-thiadiazolyl)diazonium chloride in the hydrochloric acid bath, is warmed up to 80° C. for 2 hours, and then the excess hydrochloric acid and water distilled under vacuum at a temperature of 45° to 60° C. to a volume of approximately 250 milliliters. The undistilled material is neutralized with concentrated ammonium hydroxide to a pH of 9.1 and the thus produced 2-amino-5-chloro-1,3,4-thiadiazole is filtered out and washed with cold water. Without drying 100 parts calculated on a dry basis of 2-amino-5-chloro-1,3,4-thiadiazole is mixed with sufficient water to give a total of 700 parts of water including the water originally present in wet 2-amino-5-chloro-1,3,4-thiadiazole and then 220 parts of 37% sodium sulfhydrate solution is added thereto. The mixture is heated at reflux until the reaction is complete, then cooled to room temperature, acidified with hydrochloric acid, and the 2-amino-5-mercapto-1,3,4-thiadiazole is filtered out, washed with water, and dried. This second crop is added to the initial crop of 2-amino-5-mercapto-1,3,4-thiadiazole thus giving an improved overall yield.

*Example 2*

One hundred and seventy-six grams of dry recrystallized 2,5-diamino-1,3,4-thiadiazole hydrochloride hydrate is added to 100 milliliters of concentrated hydrochloric acid (12 normal). Eighty grams of sodium nitrite was dissolved in 100 milliliters of water, the hydrochloric acid containing the 2,5-diamino-1,3,4-thiadiazole, is chilled in an acetone carbon dioxide snow bath and kept at a temperature of from −5° to −15° C. as the sodium nitrite solution is added dropwise with stirring. A drop or two of the silicone sold as Dow-Corning Anti-Foam A is added to break the foam as necessary. After the sodium nitrite is added, the mixture is stirred an additional 2 hours while maintained cold. Without isolation of the product the reaction mixture is warmed to 80° C. for an hour and forty-five minutes and then under water pump vacuum distilled at a temperature of 45° to 60° C. to a residual volume of 250 milliliters. The residue is chilled and with stirring neutralized with 250 milliliters of concentrated ammonia giving a final pH of 9.15. The 2-amino-5-chloro-1,3,4-thiadiazole crystallizes, is filtered out, washed with 200 milliliters of cold water, dried at 60° C. overnight, resulting in a yield of 88.6% of theoretical.

*Example 3*

A mixture is prepared of 800 parts of water and 240 parts of a 37% sodium sulfhydrate solution to which is added 20 parts of a 12% solution of sodium di-(2-ethylhexyl)sulfosuccinate. To this solution is added 110 parts of 2-amino-5-chloro-1,3,4-thiadiazole. The mixture is heated at reflux until the reaction is complete, the mixture cooled to room temperature and acidified with hydrochloric acid. The product which separates in crystalline form is removed by filtration, washed with water, and dried. A yield of 104 grams of 2-amino-5-mercapto-1,3,4-thiadiazole is obtained which has a purity of 95% by ultraviolet analysis giving a real yield of 92.2%.

*Example 4*

To 20 parts of water containing 3.30 parts of 50% sodium hydroxide is added 7.9 parts of 2-amino-5-chloro-1,3,4-thiadiazole hydrochloride. The resultant aqueous solution is added to a mixture of 100 parts of water and 6.75 parts of a 50% sodium hydroxide solution. Hydrogen sulfide gas is passed into the solution until the solution is saturated. The mixture is then heated at reflux until the reaction is complete, additional hydrogen sulfide gas being passed into the reaction mixture during the heating period.

The mixture is cooled and filtered to remove impurities, and then acidified. The crystalline 2-amino-5-mercapto-1,3,4-thiadiazole which separates is removed by filtration, washed with water, and dried. 4.4 parts of a product analyzing 90% pure is obtained showing a yield of 71.5% of theory.

*Example 5*

To a solution of 9.3 parts of 2-amino-5-chloro-1,3,4-thiadiazole hydrochloride monohydrate in 80 parts of ethanol is added 3.75 parts of 50% aqueous sodium hydroxide. 6.1 parts of sodium sulfhydrate is added to the solution, the mixture heated to reflux and maintained at reflux until the reaction is substantially completed. After cooling, 400 parts of water is added. The alcohol and water are removed by distillation until 100 parts by volume remain. On again cooling 2-amino-5-mercapto-1,3,4-thiadiazole crystallizes out which is separated by filtration, washed with water, and dried.

*Example 6*

The procedure of Example 3 is followed except that a stoichiometric equivalent of potassium sulfhydrate is used in place of sodium sulfhydrate. A comparable yield of a comparable product is obtained.

*Example 7*

The procedure of Example 3 is followed using a stoichiometric quality of calcium sulfhydrate instead of sodium sulfhydrate. A comparable quantity of 2-amino-5-mercapto-1,3,4-thiadiazole is obtained.

We claim:

1. The process of converting N,N'-bis(thiocarbamyl)hydrazine to 2-amino-5-mercapto-1,3,4-thiadiazole in a high yield which comprises: cyclizing N,N'-bis(thiocarbamyl)hydrazine, separating out a first crop of 2-amino-5-mercapto-1,3,4-thiadiazole, additionally separating out 2,5-diamino-1,3,4-thiadiazole, diazotizing said 2,5-diamino-1,3,4-thiadiazole, chlorinating the diazotized material to form 2-amino-5-chloro-1,3,4-thiadiazole, heating said 2-amino-5-chloro-1,3,4-thiadiazole with at least about a stoichiometric quantity of a metal sulfhydrate, and separating out a second crop of 2-amino-5-mercapto-1,3,4-thiadiazole, thereby increasing the yield of 2-amino-5-mercapto-1,3,4-thiadiazole above that which can be obtained by ring closure alone.

2. The process of claim 1 in which the metal sulfhydrate is an alkali metal sulfhydrate.

3. The process of claim 1 in which the metal sulfhydrate is an alkaline earth metal sulfhydrate.

References Cited in the file of this patent

UNITED STATES PATENTS 2,708,670     Horclois et al. _____ May 17, 1955

FOREIGN PATENTS 827,948     Germany _____ Jan. 14, 1952

OTHER REFERENCES

Houben: "Die Methoden der Org. Chem." (3d ed.), vol. 3, pp. 1240–41 (1943).

UNITED STATES PATENT OFFICE

CERTIFICATE OF CORRECTION

Patent No. 2,891,961 June 23, 1959

Richard J. Turner et al.

It is hereby certified that error appears in the printed specification of the above numbered patent requiring correction and that the said Letters Patent should read as corrected below.

Column 1, line 38, after "ammonia" insert -- gives --.

Signed and sealed this 15th day of March 1960.

(SEAL)
Attest:

KARL H. AXLINE
Attesting Officer

ROBERT C. WATSON
Commissioner of Patents